United States Patent [19]
Witthoft et al.

[11] Patent Number: 5,083,015
[45] Date of Patent: Jan. 21, 1992

[54] OPTICAL CENTROID PROCESSOR WAVEFRONT SENSOR

[75] Inventors: Carl G. Witthoft, Acton; Allan Wirth, Bedford; Lawrence Schmutz, Watertown, all of Mass.

[73] Assignee: United Technologies Corporation, Hartford, Conn.

[21] Appl. No.: 623,834

[22] Filed: Nov. 16, 1990

[51] Int. Cl.$^5$ .............................................. H01J 40/00
[52] U.S. Cl. .................................. 250/201.9; 356/354
[58] Field of Search ...................... 250/201.9, 237 R; 356/121, 354, 359

[56] References Cited

U.S. PATENT DOCUMENTS

| | | | |
|---|---|---|---|
| 4,141,652 | 2/1979 | Feinleib | 356/121 |
| 4,399,356 | 8/1984 | Feinleib et al. | 250/201 |
| 4,725,138 | 2/1988 | Wirth et al. | 356/121 |
| 4,737,621 | 4/1988 | Gonsiorowski et al. | 250/201.9 |
| 4,950,878 | 8/1990 | Ulich et al. | 356/354 |
| 4,996,412 | 2/1991 | Anafi et al. | 250/201.9 |

Primary Examiner—David C. Nelms
Assistant Examiner—S. Allen

[57] ABSTRACT

An improved optical centroid processor wavefront sensor is described in which an image is optically impinged on a plurality of mask arrays. A group of mask arrays, having a coarse dependant function, filters light onto corresponding photodetector arrays. The output of the photodetectors provide a coarse signal indicative of spot displacement over an increased tilt dynamic range. Another group of mask arrays, having a fine dependant function, filters light onto corresponding photodetector arrays. The output of the photodetectors provide a fine signal indicative of spot displacement with an increased accuracy. The coarse and fine signals may be employed by a deformable mirror to correct aberrations in a light beam wavefront.

17 Claims, 7 Drawing Sheets

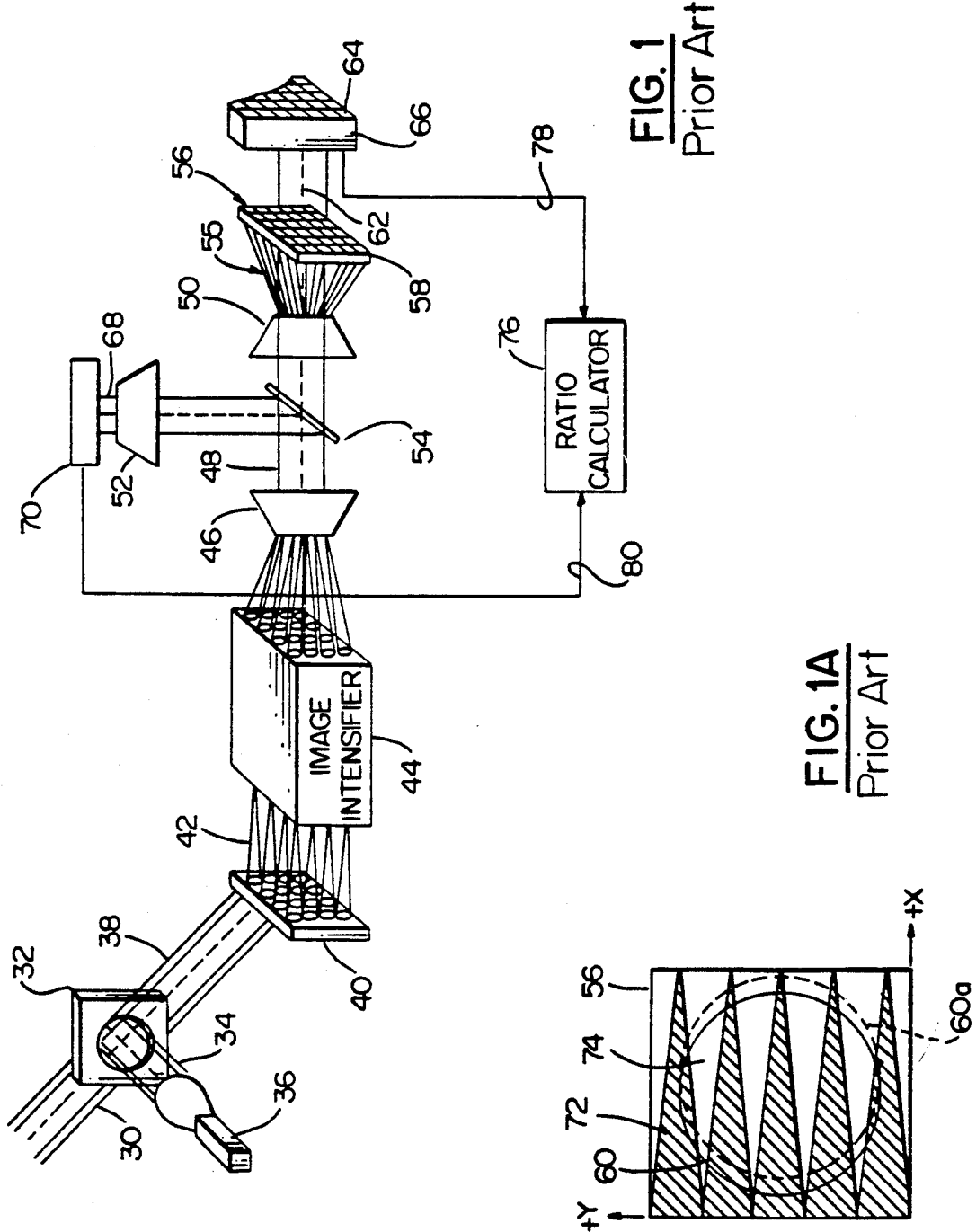

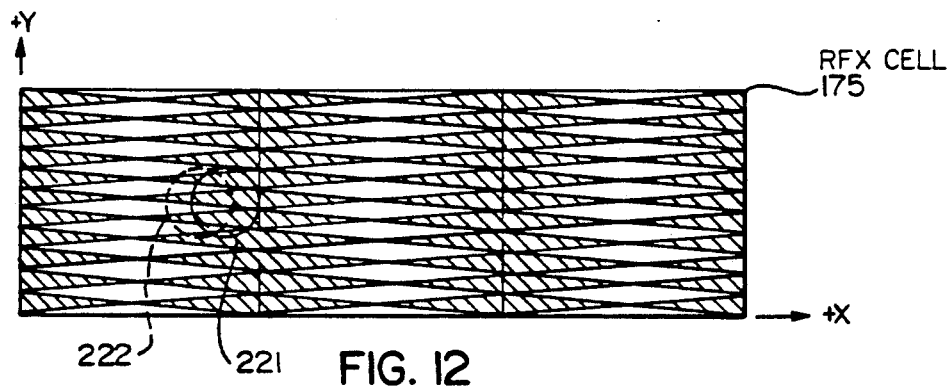
FIG. 12
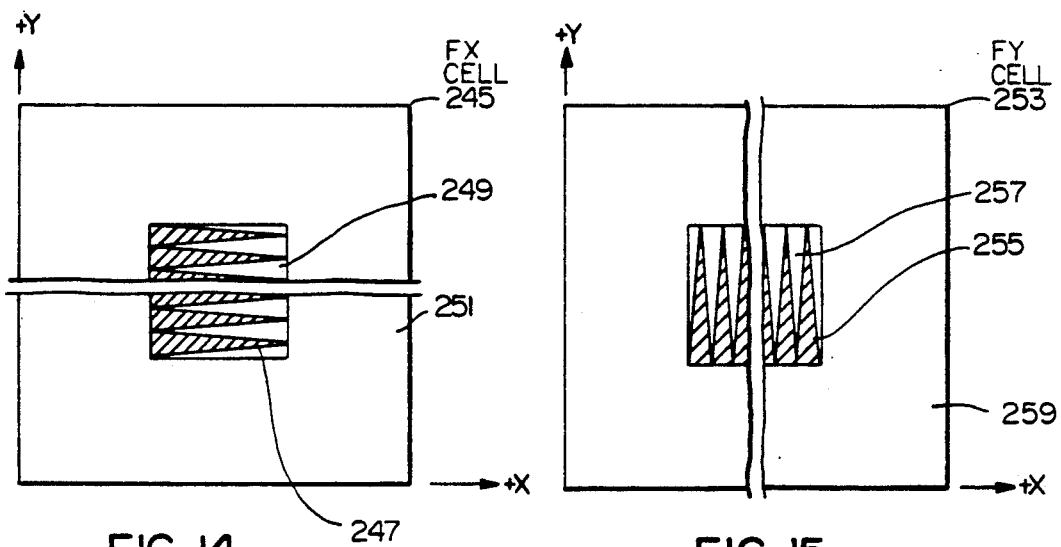
FIG. 14
FIG. 15
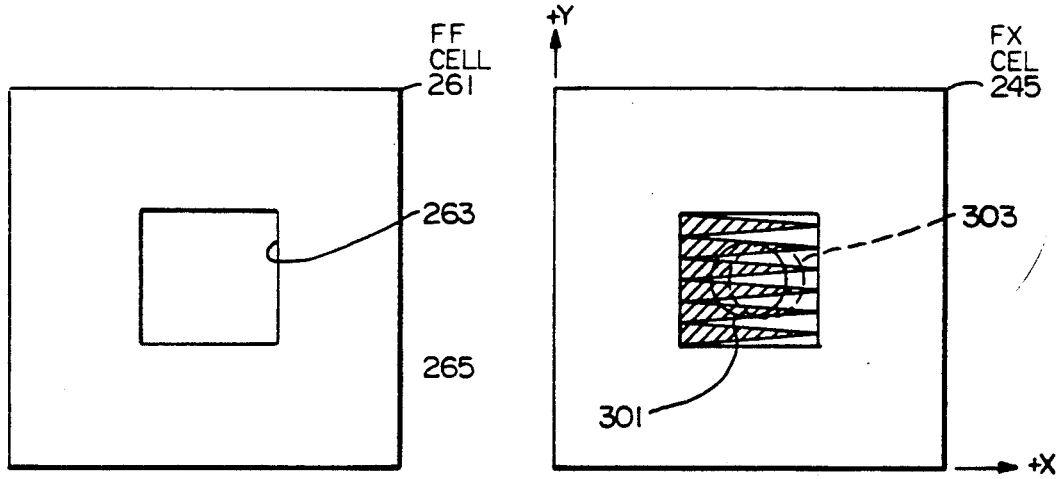
FIG. 16
FIG. 17

OPTICAL CENTROID PROCESSOR WAVEFRONT SENSOR

DESCRIPTION

1. Technical Field

This invention relates to optical wavefront sensing and more particularly to optical centroid processor wavefront sensing.

2. Background Art

Adaptive optic systems for correcting wavefront distortions in a light beam are well known in the art. A critical element of these systems is the wavefront sensor which detects the distortions. The distortions are generally caused by the wavefront passing through an atmospheric disturbance. The resolution of the wavefront is improved by correcting these distortions, which must first be accurately detected.

The apparatus labeled prior art in FIG. 1 herein of U.S. Pat. No. 4,725,138 to Wirth et al., is a method for detecting the distortions. The apparatus is an optical centroid processor, hereinafter referred to as "OCP" wavefront sensor which employes a filter array to detect a wavefront tilt.

Referring to FIG. 1 herein, a light beam 30 from a distant object or the return beam from an object illuminated by a reference source is focused on the apparatus. The light beam 30 may be combined in a beam combiner 32 with a reference beam 34, generally from a laser 36, forming a combined beam 38 which is imaged on a lenslet array 40. The lenslet array divides the combined beam 38 into a plurality of subaperture beams 42 which are focused on an image intensifier 44. The subaperture beams are amplified and focused on a collimator 46. The collimated beams 48 are impinged on a pair of lenses 50, 52 by a beam splitter 54. The first lens 50 focuses subaperture images 55 on each cell 56 of a filter array 58 forming a pixel spot on each cell, the circumference of which is shown by a line 60 (FIG. 1A). A filtered subaperture image 62 is impinged on each corresponding cell 64 of a photodetector array 66. The detector array 64 comprises a plurality of photodiodes or other devices which convert photon energy to electric energy. The second lens 52 focuses a subaperture image 68 directly on each cell of a reference photodetector array 70.

Each mask cell 56 comprises a plurality of opaque chevrons 72 (FIG. 1A) which are wider on one end and decrease in the positive x-direction, and a plurality of transparent chevrons 74 which are wider on the other end and decrease in the negative x-direction. Whenever there is a tilt in the wavefront in the x-direction, the spot, indicated by a dashed line 60a, from the subaperture beam 55 is shifted from the center of the mask cell increasing the intensity of the light through the cell to the photodiode as compared the center spot, assuming the same intensity. A corresponding pixel spot (i.e. a shifted spot when there is a tilt and an un-shifted spot when there is not) is also measured without passing through a filter array on the reference photodetector array 70. The amount of light to the photodiode directly corresponds to the electrical output of the photodiode.

Thus, for a particular pixel cell, the photodiode output is compared to the reference photodiode output of the corresponding cell to determine the amount of shift in the spot. A ratio calculator 76 is connected to the photodetector arrays 66, 70 by a pair of lines 78, 80, to perform calculations based on a predetermined algorithm. The shift in spot position represents the tilt in a portion of the wavefront in the x-direction. The information obtained from the ratio calculator is used to correct the tilt in the wavefront of the original light beam by adjusting a deformable mirror (not shown).

The OCP sensor also provides for detecting the wavefront tilt on two axes as described in an alternate embodiment of the apparatus in the '138 patent. Referring now to FIG. 2 herein, the image impinged on the collimator 82 is achieved in the same manner as previously described. The collimator focuses three identical images 84 on three separate identical lenses 86, 88, 90. The first lens 86 focuses a subaperture image 92 on each cell 93 of a first filter array 94, which consists of mask cells 93 (FIG. 2B) comprising a plurality of opaque chevrons 98 and a plurality of transparent chevrons 100 in the x-plane. A pixel spot, the circumference of which is shown by a line 102, is focused on the center of the mask cell when this portion of the wavefront is without a tilt. When this portion of the wavefront is tilted, a shifted spot, shown by a dashed line 102a, is produced. The intensity of the light 103 through the x-direction cell 93 is detected by the corresponding photodiode in the first photodetector array 104 (FIG. 2). The second lens 88 focuses a plurality of subaperture images 105 directly on a second photodetector array 106. The third lens 90 focuses a plurality of subaperture images 108 on a second filter array 110, which comprises an array of mask cells 112 (FIG. 2C), each cell having a plurality of opaque chevrons 114 and a plurality of transparent chevrons 116 in the y-plane. A pixel spot, the circumference of which is shown by a line 118, is focused on the center of the mask cell when this portion of the wavefront is without a tilt. When this portion of the wavefront is tilted a shifted spot, shown by a dashed line 118a, is produced. The intensity of the light through the y-direction cell 112 is detected by the corresponding photodiode in the third photodetector array 122. An output signal of each of the corresponding photodiodes for the x-direction and each of the photodiodes for the y-direction are compared to the corresponding photodiode output signal in the second photodetector array by the ratio calculator. Thus, wavefront tilt can be detected on two axes.

Generally, the OCP system described in patent '138 has a dynamic range of less than 4 wavelengths of tilt on the input beam. The dynamic range can be increases by minimizing the size of the spot on a cell. However, this results in a significant loss of accuracy and is limited to a spot diameter of approximately three times the width of a single chevron in a cell.

DISCLOSURE OF THE INVENTION

Objects of the present invention include provision of an improved OCP wavefront sensor, which detects an optical wavefront on multiple axes over an increased tilt dynamic range with an increased tilt accuracy.

In accordance with the present invention, an image is optically impinged on a plurality of mask arrays having a coarse dependant function, on another plurality of mask arrays having a fine dependant function and on each cell of at least one reference photodetector array, the masked images being focused on a plurality of corresponding photodetector arrays, the photodetector array outputs corresponding to the mask arrays having a coarse dependant function are compared to the reference photodetector array output, and the photodetector array outputs corresponding to the mask arrays having a fine dependant function are compared to the reference photodetector array output, for each of a pair of directional axes, to produce an electrical signal indicative of a wavefront aberration.

The present invention detects a wavefront tilt over an extremely wide tilt dynamic range at higher accuracy levels than prior art OCP systems. The invention also detects tilt on two axes to optimize the adjustments to the original light beam wavefront. Further, this invention increases dynamic range without sacrificing accuracy (as in the prior art).

The foregoing and other objects, features and advantages of the present invention will become more apparent in light of the following detailed description of an embodiment of the invention, as shown in the accompanying drawing.

BRIEF DESCRIPTION OF THE DRAWINGS

FIG. 1 is a perspective view of the prior art OCP sensor taken from FIG. 1 of U.S. Pat. No. 4,725,138;

FIG. 1A is a front view of the prior art cell with a pixel spot taken from FIG. 1 of U.S. Pat. No. 4,725,138;

FIG. 12 is a front partial view of a RFX filter cell with a pixel spot in accordance with the present invention;

FIG. 14 is a front view of a single FX filter cell in accordance with the present invention;

FIG. 15 is a front view of a single FY filter cell in accordance with the present invention;

FIG. 16 is a front view of a FF cell in accordance with the present invention; and FIG. 17 is a front view of a FX filter cell with a pixel spot in accordance with the present invention.

BEST MODE FOR CARRYING OUT THE INVENTION

I. OPEN-LOOP SYSTEM

Figure 2A:
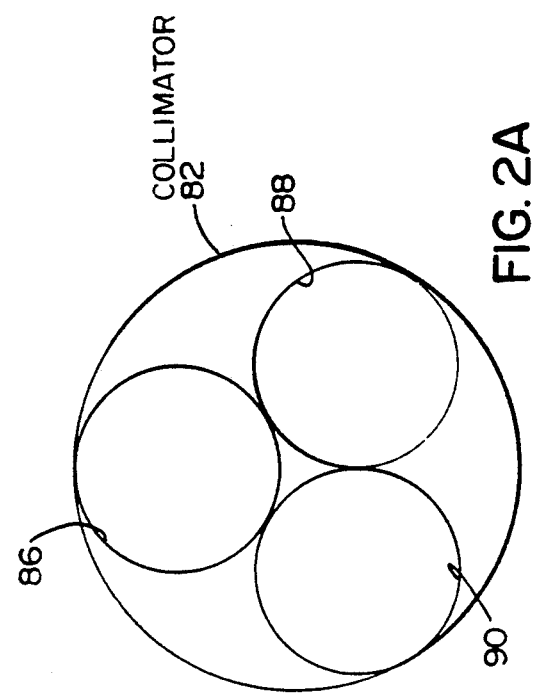
FIG. 2A is a front view in the direction of the lines 2A—2A of FIG. 2 taken from FIG. 9A of U.S. Pat. No. 4,725,138.
Figure 2C:
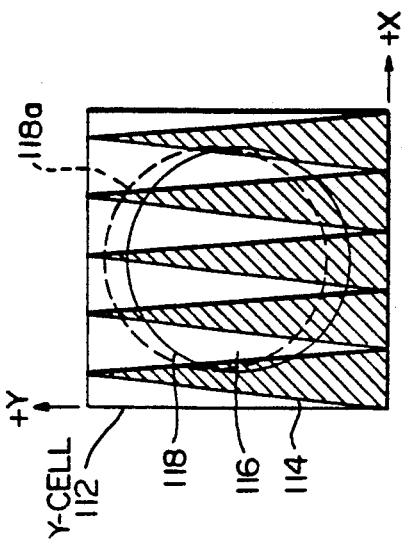
FIG. 2C is a front view of a prior art y-direction cell with a pixel spot taken from FIG. 9 of U.S. Pat. No. 4,724,138.
Figure 2:
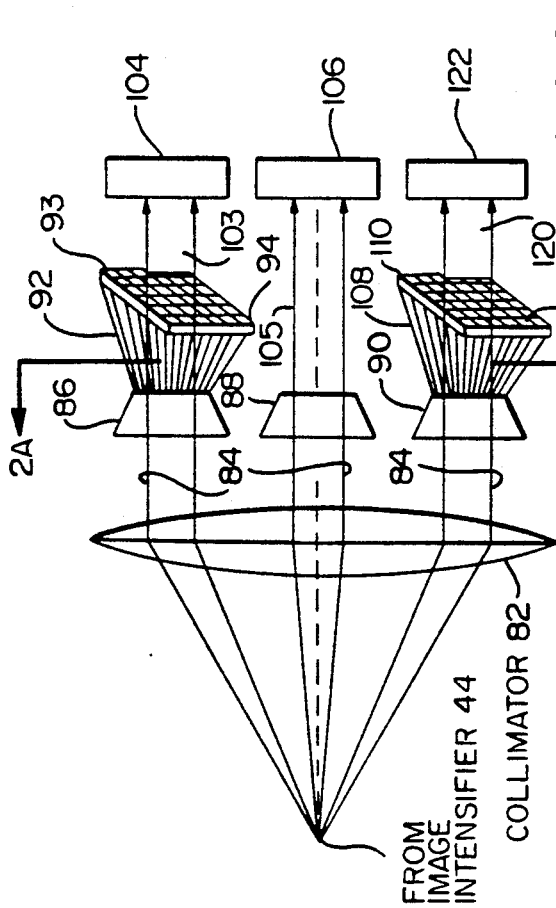
FIG. 2 is schematic view of the prior art two axes wavefront sensor taken from FIG. 9 of U.S. Pat. No. 4,725,138.
Figure 2B:
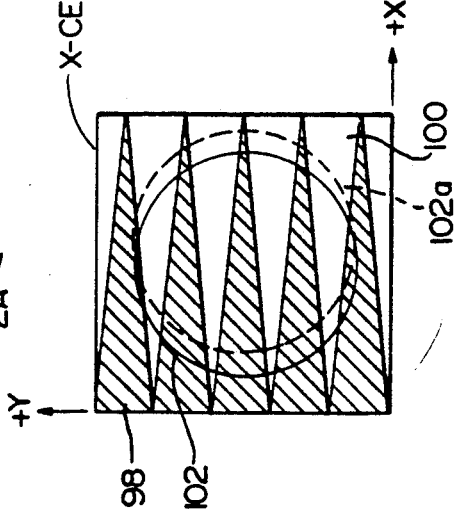
FIG. 2B is front view of a prior art x-direction cell with a pixel spot taken from FIG. 9 of U.S. Pat. No. 4,725,138.
Figure 3:
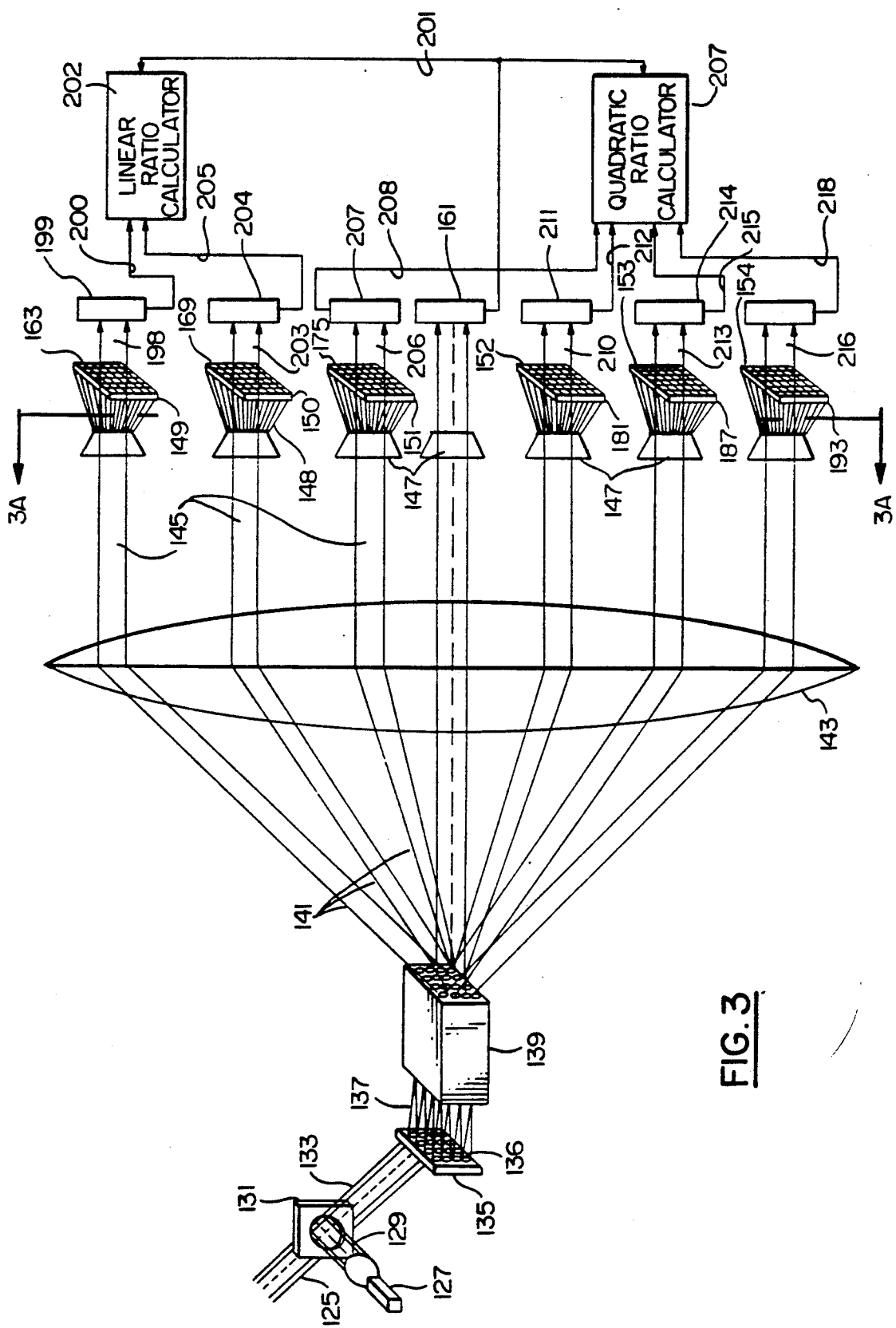
FIG. 3 is a simplified schematic diagram of an embodiment of a coarse-fine OCP wavefront sensor according to the present invention.

Referring now to FIG. 3, in an embodiment of the present invention, an external light beam 125 is focused on the invention. The light beam 125 is from a distant object or may be a return beam from an illuminated object, in either of which a wavefront aberration is to be detected. A laser 127 provides a reference light beam 129 which may be combined with the light beam 125 in a beam combiner 131 to form a combined beam 133. The combined beam is focused on a lenslet array 135 which comprises an array of individual lenses 136. The lenslet array 135 divides the combined beam 133 into a plurality of subaperture beams 137 which are focused on an image intensifier 139 resulting in a plurality of amplified subaperture images 141.

The amplified subaperture images 141 are collimated in a collimator 143 and seven identical separate beams 145 are focused on seven corresponding identical imaging lenses 147, which focuses an identical spot pattern 148 on each filter array 149-154 and on a photodetector array 161.

Figure 4:
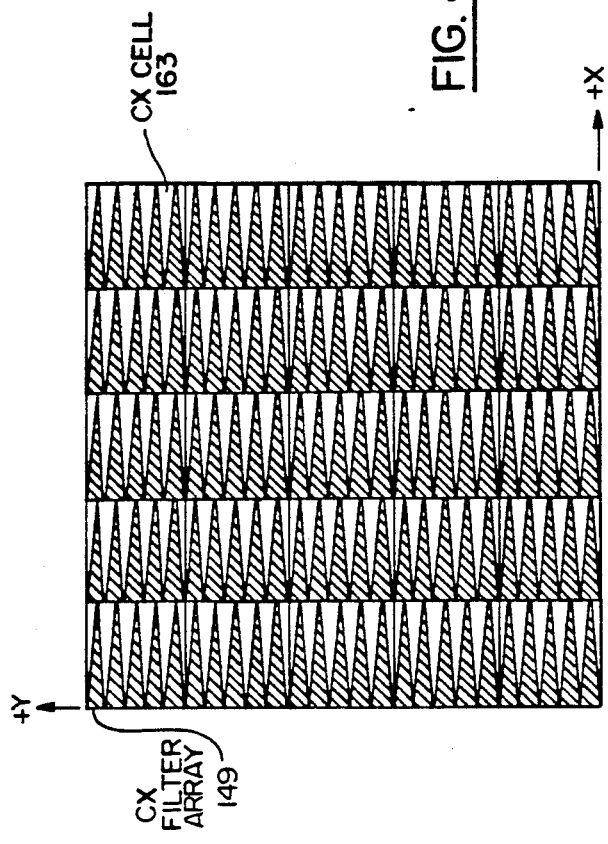
FIG. 4 is a front view of a CX channel filter array in accordance with the invention.
Figure 5:
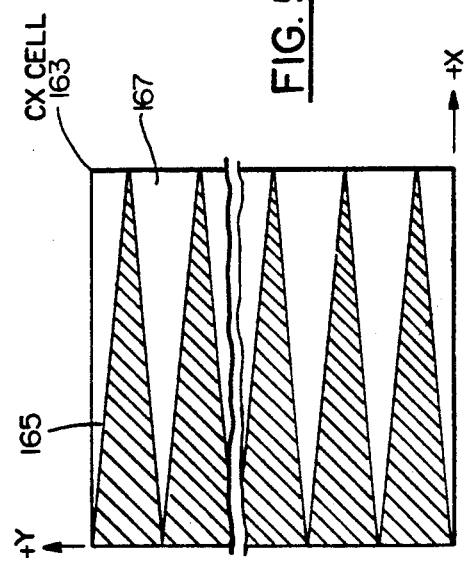
FIG. 5 is a front view of a single CY channel filter cell in accordance with the present invention.

The filter array 149 is the coarse dependant function, x-direction ("CX") filter array, and comprises a plurality of CX mask cells 163. Referring now to FIGS. 4 and 5, each CX cell 163 of the CX filter array 149 comprises a plurality of opaque elongated "V" shape or chevron patterns 165, hereinafter referred to as chevrons, which are wider at one end and decrease in the positive x-direction and a plurality of transparent chevrons 167 which are wide at the other end and decrease in the negative x-direction.

Figure 6:
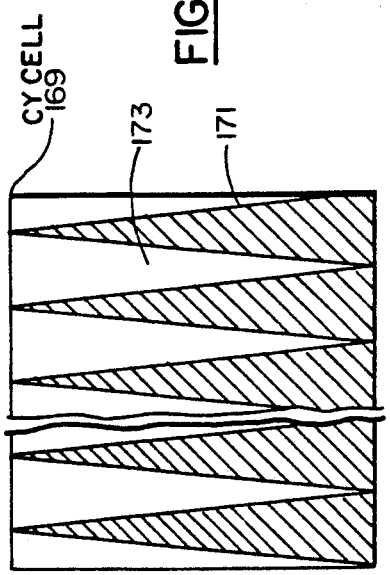
FIG. 6 is a front view of a single CY channel filter cell in accordance with the present invention.
Figure 3A:
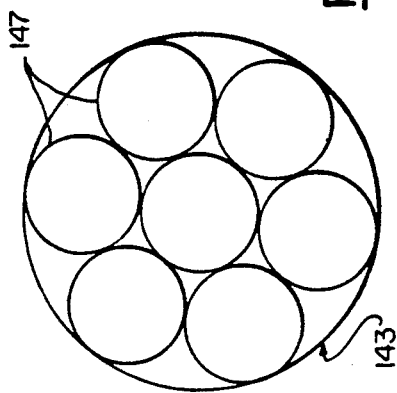
FIG. 3A is a front view in the direction of the lines 3A—3A of FIG. 3.

The filter array 150 (FIG. 3) is the coarse dependant function, y-direction ("CY") filter array, and comprises a plurality of CY mask cells 169 (similar to the cells 163 in FIGS. 4 and 5). Referring now to FIG. 6, each CY cell 169 comprises a plurality of opaque chevrons 171 which are wider at one end and decrease in the positive y-direction and a plurality of transparent chevrons 173 which are wide at the other end and decrease in the negative y-direction.

Figure 7:
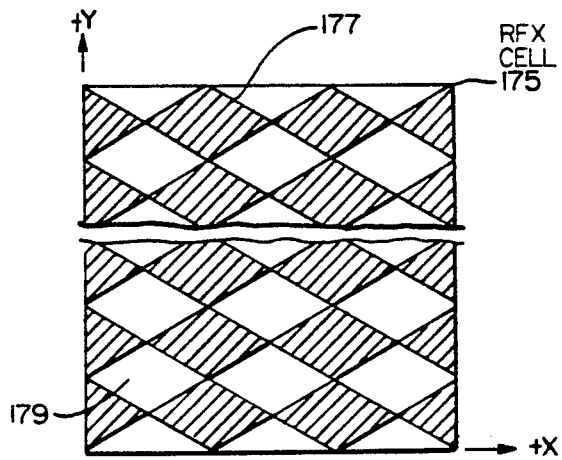
FIG. 7 is a front view of a single RFX channel filter cell in accordance with the present invention.

The filter array 151 (FIG. 3) is the real phase fine dependant function, x-direction ("RFX") filter array, and comprises a plurality of RFX mask cells 175 (similar to the cells 163 in FIGS. 4 and 5). Referring now to FIG. 7, each RFX cell 175 comprises a plurality of opaque elongated diamond patterns 177 which are a half diamond at one end followed by a plurality of repeated full diamonds and a half diamond at the other end in the x-direction and a plurality of transparent elongated diamond patterns 179 which are a plurality of full diamonds from end to end in the x-direction.

Figure 8:
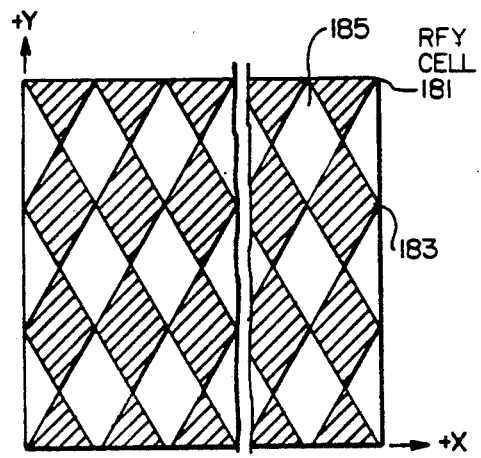
FIG. 8 is a front view of a single RFY channel filter cell in accordance with the present invention.

The filter array 152 (FIG. 3) is the real phase fine dependant function, y-direction ("RFY") filter array, and comprises a plurality of RFY mask cells 181 (similar to the cells 163 in FIGS. 4 and 5. Referring now to FIG. 8, each RFY cell 181 comprises a plurality of opaque elongated diamond patterns 183 which are a half diamond at one end followed by a plurality of repeated full diamonds and a half diamond at the other end in the y-direction and a plurality of transparent elongated diamond patterns 185 which are a plurality of full diamonds from end to end in the y-direction.

The filter array 153 (FIG. 3) is the imaginary phase fine dependant function, x-direction ("IFX") filter array, and comprises a plurality of IFX mask cells 187

Figure 9:
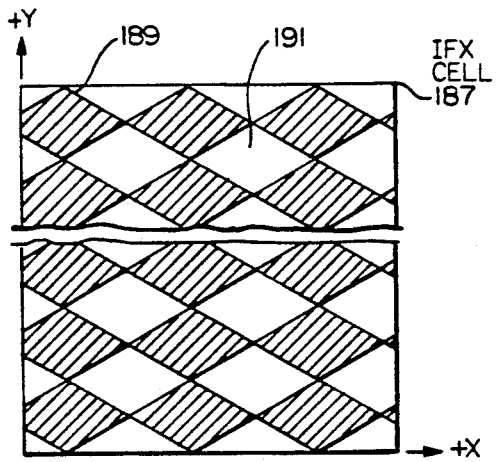
FIG. 9 is a front view of a single IFX channel filter cell in accordance with the present invention.

(similar to the cells 163 in FIGS. 4 and 5). Referring now to FIG. 9, each IFX cell 187 comprises a plurality of opaque elongated diamond patterns 189 and a plurality of transparent elongated diamond patterns 191 in the x-direction which are shifted by one quarter of a diamond length in the positive x-direction as compared to the RFX cell 175 (FIG. 7), to provide quadrature signals for x-direction calculations. This allows unambiguous determination of a pixel spot position on a real phase fine dependant transfer curve.

Figure 10:
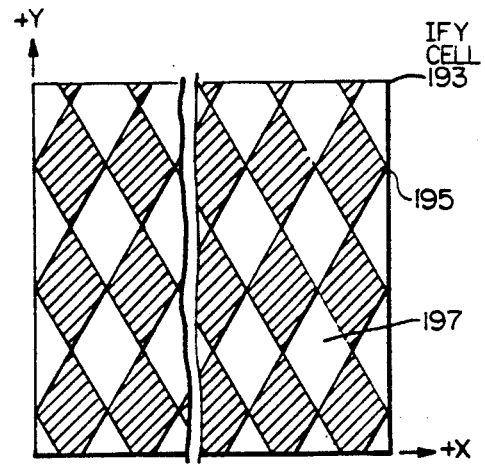
FIG. 10 is a front view of a single IFY channel filter cell in accordance with the present invention.

The filter array 154 (FIG. 3) is the imaginary phase fine dependant function, y-direction ("IFY") filter array, and comprises a plurality of IFY mask cells 193 (similar to the cells 163 in FIGS. 4 and 5. Referring now to FIG. 10, each IFY cell 193 comprises a plurality of opaque elongated diamond patterns 195 and a plurality of transparent elongated diamond patterns 197 in the y-direction which are which are shifted by one quarter of a diamond length in the positive y-direction as compared to the RFY cell 181 (FIG. 8), to provide quadrature signals for y-direction calculations.

Each mask cell has a glass substrate, whereupon the opaque area comprises a thin chrome film on the substrate and the transparent area comprises an absences of such film. Note that FIGS. 4 thru 12 are not to scale and are shown with a minimum of five opaque patterns per cell for illustration purposes, a cell actually comprises many patterns such that a pixel spot of light will cover many of the patterns. The patterns are intended to be very small so as to average out any spot motion in the axis opposite from that which the cell is detecting.

The intensity of the remaining light 198 (FIG. 3) emanating from the CX filter array 149 impinges on a CX photodetector array 199. Each cell of the CX photodetector array comprises a known type photodiode which converts photon energy into electrical energy. Each CX mask cell 163 focuses on a corresponding photodiode in the array 199 to produce an output on a corresponding one of a plurality of lines 200 which is compared to a corresponding output on a related one of a plurality of lines 201 from the reference photodetector array in a linear ratio calculator 202. The outputs, one from each of the photodiodes in the array, may be individual parallel outputs or the outputs may be clocked to produce a serial output. This comparison is made for each CX cell, and thus for each pixel spot of the image, to detect all the x-axis tilts in the wavefront.

The intensity of the remaining light 203 emanating from the CY filter array 150 impinges on a CY photodetector array 204. Each CY mask cell 169 focuses on a corresponding cell of the CY photodetector array 204, wherein each cell comprises a photodiode. Each photodiode produces an output on a corresponding one of a plurality of lines 205 which is compared to the corresponding output on a related one of the lines 201 from the reference photodetector array in the linear ratio calculator 202. This comparison is made for each CY cell to detect all the y-axis tilts in the wavefront.

The intensity of the remaining light 206 emanating from the RFX filter array 151 impinges on a RFX photodetector array 207. Each RFX mask cell 175 focuses on a corresponding cell of the RFX photodetector array 207, wherein each cell comprises a photodiode. Each photodiode produces an output on a corresponding one of a plurality of lines 208 which is compared to the corresponding output on a related one of the lines 201 from the reference photodetector array in a quadratic ratio calculator 209. This comparison is made for each of the RFX cells 175 to detect the x-axis tilts in the wavefront. However, the quadratic calculation requires both the real and imaginary components, thus, the comparison of the RFX cell is combined with a comparison of a corresponding IFX cell to detect the x-axis tilts in the light beam.

The intensity of the remaining light 210 emanating from the RFY filter array 152 impinges on a RFY photodetector array 211. Each RFY mask cell 181 focuses on a corresponding cell of the RFY photodetector array 211, wherein each cell comprises a photodiode. Each photodiode produces an output on a corresponding one of a plurality of lines 212 which is compared to the corresponding output on a related one of the lines 201 from the reference photodetector array in the quadratic ratio calculator 209. This comparison is made for each RFY cell to detected the y-axis tilts in the wavefront. The comparison of a RFY cell is combined with a comparison of a corresponding IFY cell for a quadratic calculation to detect the y-axis tilts in the light beam.

The intensity of the remaining light 213 emanating from the IFX filter array 153 impinges on an IFX photodetector array 214. Each IFX mask cell 187 focuses on a corresponding cell of the IFX photodetector array 214, wherein each cell comprises a photodiode. Each photodiode produces an output on a corresponding one of a plurality of lines 215 which is compared to the corresponding output on a related one of the lines 201 from the reference photodetector array in the quadratic ratio calculator 209. This comparison is made for each IFX cell to detect the x-axis tilts in the wavefront. The comparison of the IFX cell is combined with a comparison of a corresponding RFX cell as previously described to detect x-axis tilts.

The intensity of the remaining light 216 emanating from the IFY filter array 154 impinges on a IFY photodetector array 217. Each IFY mask cell 193 focuses on a corresponding cell of the IFY photodetector array 217, wherein each cell comprises a photodiode. Each photodiode produces an output on a corresponding one of a plurality of lines 218 which is compared to the corresponding output on a related one of the lines 201 from the reference photodetector array in the quadratic ratio calculator 209. This comparison is made for each IFY cell to detected the y-axis tilts in the wavefront. The comparison of the IFY cell is combined with a comparison of a corresponding RFY cell as previously described to detect y-axis tilts.

This is an open-loop system and the coarse and fine portions function simultaneously to detect a tilt in the wavefront. The coarse portion functions over the full tilt range with limited accuracy and the fine portion detects a very accurate tilt without an absolute reference to the coarse portion. A common problem with OCP type systems is the two-pi ambiguity error, which is the result of a large tilt in a wavefront being detected as less than a full wave. This occurs when the tilt exceeds the range of the cell. To avoid this problem and assure correct operation in the presence of noise, the tilt dynamic range of the fine portion should be on the order of four times the RMS noise of the coarse portion. This constraint assures that errors generated by noise in the coarse portion will not lead to the two-pi ambiguity in the fine portion.

Figure 11:
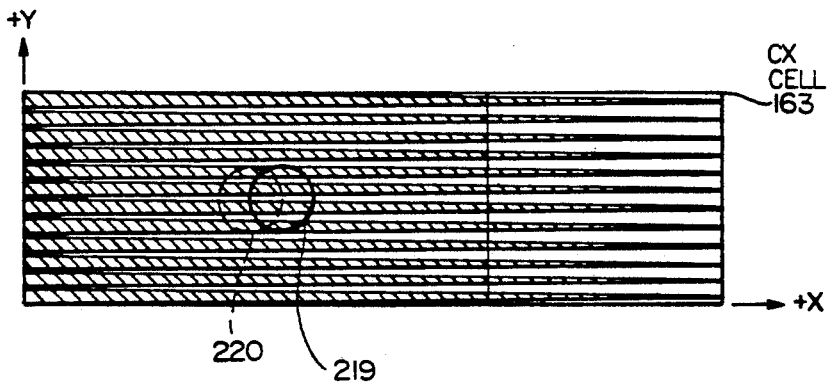
FIG. 11 is a front partial view of a CX filter cell with a pixel spot in accordance with the present invention.

The size and location of each mask cell corresponds directly to each subaperture size and location in the lenslet array 135 (FIG. 3). Each subaperture beam 137 is intensified, collimated and focused forming a pixel spot on each corresponding cell. Referring now to FIG. 11, a portion of the CX cell 163 is shown with a centered pixel spot, the circumference of which is shown by a solid line 219. The size of a pixel spot in the coarse portion is minimized in order to achieve the largest dynamic range. However, the minimum spot diameter is limited to approximately the width of the widest portion of three chevrons, so that spot shifts in the axis opposite from that which the cell is detecting will still be averaged out. The centered spot 219 produces a CX reference ratio from which a shift in the pixel spot is compared. The reference ratio for the cell is the intensity of light through the mask cell with the spot in the center as compared to the intensity of light to the corresponding cell in the reference photodetector array 161 (FIG. 3). A tilt in the positive x-direction in the subaperture beam on this cell results in a shifted pixel spot, indicated by a dashed line 220. The shifted spot allows more light through the filter cell, assuming equal intensity, which is compared to the light intensity from the corresponding reference cell 161 (FIG. 3) and results in a CX ratio. The CX ratio of the shifted pixel spot is compared to the CX reference ratio for that cell to determine the amount of tilt. The difference requires a correction to the light beam wavefront for this portion of the wavefront corresponding to this subaperture beam.

A tilt in the negative x-direction results in less light through the mask cell and the same type of calculations are made. This process is repeated for each cell in the CX filter array to detect the entire wavefront.

A tilt in the y-direction is detected by comparing the intensity from a shifted pixel spot to the un-shifted pixel spot on the CY filter cell in the same manner the CX cell detects tilts in the x-direction.

Referring now to FIG. 12 a portion of the RFX cell 175 is shown with a centered pixel spot, the circumference of which is shown by a solid line 221. Although the circumference of the spot is the same as in the coarse portion, it covers a greater ratio of the opaque regions of a cell, and, therefore, has a higher accuracy. The centered spot produces a RFX reference ratio from which a shift in the pixel spot is compared. The RFX reference ratio for the cell is the intensity of light through the mask cell with the spot in the center as compared to the intensity of light to the corresponding cell in the reference photodetector array 161 (FIG. 3). A tilt in the positive x-direction in the subaperture beam on this cell results in the pixel spot, indicated by a dashed line 222, which is shifted from the center. The shifted spot varies the intensity of light through the filter cell which is compared to the light intensity of the corresponding reference cell 161 (FIG. 3) and results in a RFX ratio. The RFX ratio of the shifted pixel spot is compared to the RFX reference ratio of an un-shifted pixel spot to determine the amount of tilt.

However, the RFX cell only provides the real portion of the quadratic calculation and the imaginary portion is required to determine the direction and location of the shifted spot. The real portion has an in phase or SINE function, while the imaginary portion has an out of phase or COSINE function. This combination results in unambiguous determination of the tilt. The corresponding IFX cell 187 provides the imaginary component of the quadratic calculation of tilts in the x-direction for the same subaperture beam by comparing the intensity from a shifted pixel spot to the un-shifted pixel spot on the IFX cell in the same manner the RFX cell detects the tilt. An IFX ratio and the corresponding RFX ratio are compared to determine the amount of tilt in the subaperture beam. When the ratios do not agree with the reference ratios of pixel spots located in the center, a correction to the light beam wavefront for this portion of the wavefront corresponding to this subaperture beam is required.

A tilt in the negative x-direction requires the same type of quadratic calculations to detect the tilt. This process is repeated for each cell in the RFX filter array 151 and the IFX filter array 153 to detect the entire wavefront of the light beam.

A tilt in the y-direction is detected by comparing the intensity from a shifted pixel spot to the un-shifted pixel spot on the RFY filter cell 181 and the IFY filter cell 193 in the same manner as the RFX cell 175 and the IFX cell 187 detects tilts in the x-direction.

The coarse and fine ratios for each corresponding cell are combined to, in turn, make adjustments in a known type deformable mirror (not shown), thus, correcting the tilts in the light beam. The deformable mirror comprises a plurality of electronically controlled actuators driving an array of glass or metal elements forming a face sheet. The wavefront is adjusted when the spots are centered in the CX filter cells, CY filter cells, RFX filter cells, RFY filter cells, IFX filter cells, and the IFY filter cells.

II. CLOSED-LOOP SYSTEM

Figure 13:
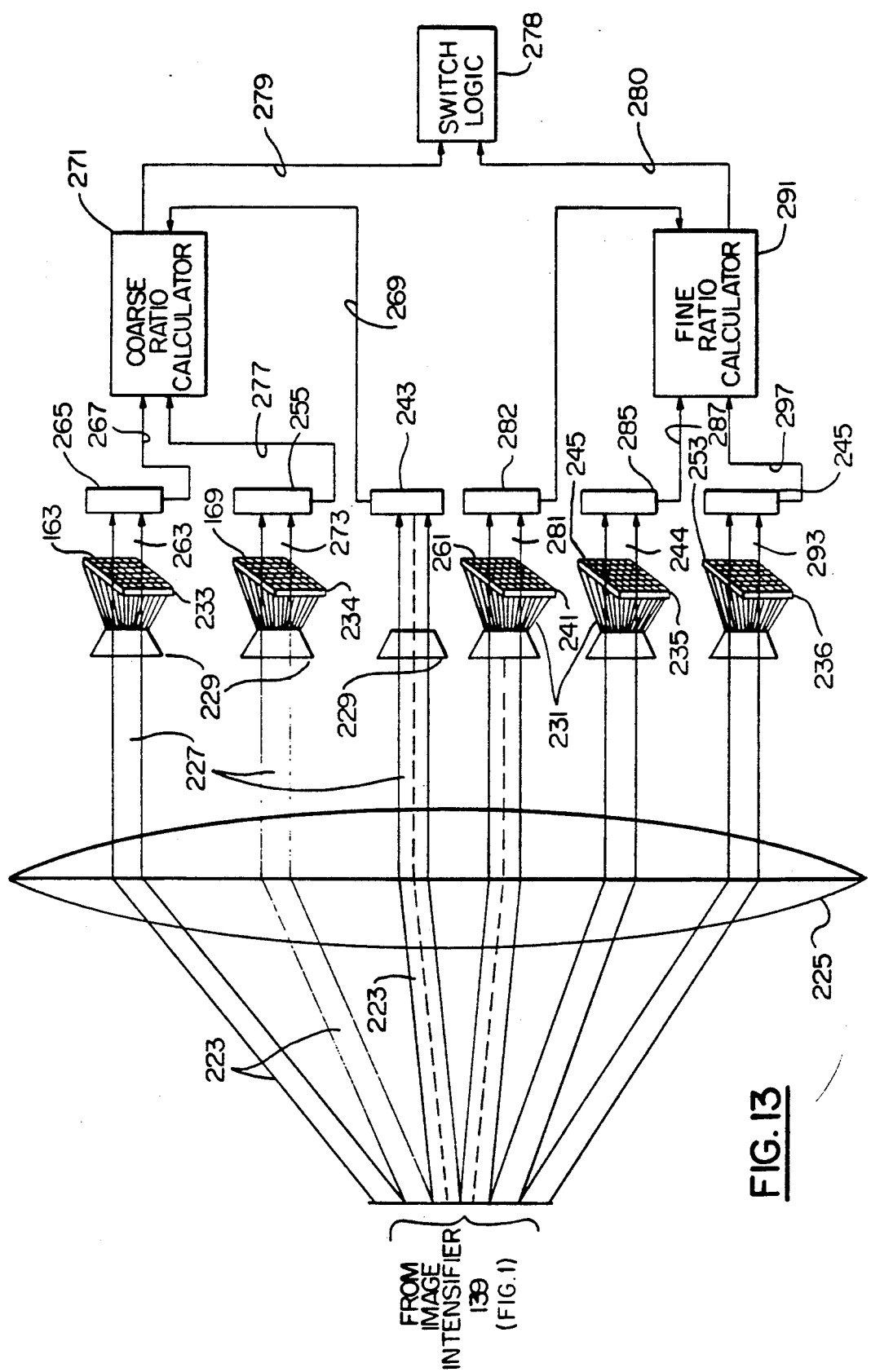
FIG. 13 is a schematic view of an alternate embodiment of the present invention.

Referring now to FIG. 13, an alternate embodiment of the present invention comprises the amplified subaperture images 223 impinged on the collimator 225 in the same manner described with respect to FIG. 3. The images are collimated in the collimator and six identical separate beams 227 are focused on six identical imaging lenses 229. Each imaging lens 229 focuses an identical spot pattern 231 on each filter array 233-236, on a reference filter ("FF") array 241, and on a photodetector array 243.

The CX filter array 233 and the CY filter array 234 comprise a plurality of CX cells 163 (FIG. 5) and CY cells 169 (FIG. 6) respectively as described in the embodiment of the invention of FIG. 3.

The filter array 235 is the fine dependant function, x-direction ("FX") filter array, and comprises a plurality of FX mask cells 245 (similar to the cells 163 in FIGS. 4 and 5). Referring now to FIG. 14, each FX cell 245 comprises a plurality of opaque chevrons 247 which are wider at one end and decrease in the positive x-direction, and a plurality of transparent chevrons 249 which are wider at the other end and decrease in the negative x-direction. The chevrons 247, 249 are surrounded by a guard band comprising an opaque border 251 such that the overall dimensions of the fine cells and the coarse cells are the same.

The filter array 236 is the fine dependant function, y-direction ("FY") filter array, and comprises a plurality of FY mask cells 253 (similar to the cells 163 in FIGS. 4 and 5). Referring now to FIG. 15, each FY cell 253 comprises a plurality of opaque chevrons 255 which are wider at one end and decrease in the positive y-direction, and a plurality of transparent chevrons 257 which are wider at the other end and decrease in the negative y-direction. The chevrons 255, 257 are surrounded by a guard band comprising an opaque border 259, such that the overall dimensions of the fine cells and the coarse cells are the same.

The FF array 241 comprises a plurality of FF cells 261 (similar to the cells 163 in FIGS. 4 and 5). Referring now to FIG. 16, each FF cell comprises a transparent window 263 having the same dimensions as that of the area occupied by the chevrons in the FX cell and the FY cell. The window 263 is surrounded by a guard band comprising an opaque border 265, such that the overall dimensions of the cells is the same the fine cells 245, 253.

The intensity of the remaining light 263 (FIG. 13) emanating from the CX filter array 233 impinges on a CX photodetector array 265. Each CX mask cell 163 focuses on a corresponding cell of the CX photodetector array 265, wherein each cell comprises a photodiode. Each photodiode produces an output on a corresponding one of a plurality of lines 267 which is compared to the corresponding output on a related one of a plurality of lines 269 from the coarse reference photodetector array in a linear coarse ratio calculator 271. This comparison is made for each CX cell to detect the x-axis tilts in the wavefront to, in turn, make coarse adjustments in the deformable mirror correcting x-axis tilts in the light beam.

The intensity of the remaining light 273 emanating from the CY filter array 234 impinges on the CY photodetector array 275. Each CY mask cell 169 focuses on a corresponding cell of the CY photodetector array 275, wherein each cell comprises a photodiode. Each photodiode produces an output on a corresponding one of a plurality of lines 277 which is compared to the corresponding output on a related one of the lines 269 from the coarse reference photodetector array 271 in the linear coarse ratio calculator 271. This comparison is made for each CY cell to detect the y-axis tilts in the wavefront to, in turn, make coarse adjustments in the deformable mirror correcting y-axis tilts in the light beam.

This is a closed-loop system so that, once the coarse adjustments in the wavefront are completed by the coarse portion, the system switches over to the fine portion for the fine adjustments to the wavefront. If at any time the coarse adjustments to the wavefront are not within the dynamic range of the fine portion the system switches back to the coarse portion. The switching may be performed by a switch logic circuit 278 which is responsive to both the coarse ratio calculator output on a line 279 and the fine ratio calculator output on a line 280. The switch logic performs the following algorithm:

IF CX RATIO=(CX REFERENCE RATIO) (FACTOR)
THEN FINE RATIO CALCULATOR OUTPUT
OTHERWISE COARSE RATIO CALCULATOR OUTPUT

The CX RATIO and the CX REFERENCE RATIO are determined in the same manner described in the open-loop embodiment of the invention. The FACTOR is the predetermined algorithm for determining the amount of shift of a pixel spot, as described in the open-loop embodiment of the invention.

The coarse portion must be capable of correcting the wavefront tilts to within the dynamic range of the fine portion of the invention. The fine portion detects wavefront tilt over a small dynamic range at a high accuracy and provides the data for the fine adjustments to the deformable mirror to correct the remaining tilts in the light beam wavefront. To ensure that the fine portion can acquire the spots in the presence of noise, the fine dynamic range should be greater than two times the RMS noise of the coarse portion.

The intensity of the remaining light 281 emanating from the FF array 241 impinges on a fine reference photodetector array 282. Each FF cell 261 focuses on a corresponding cell of the fine reference photodetector array 282, wherein each cell comprises a photodiode which produces an output on a corresponding one of a plurality on lines 283.

The intensity of the remaining light 284 emanating from the FX filter array 235 impinges on a FX photodetector array 285. Each FX mask cell 245 focuses on a corresponding cell of the FX photodetector array 285, wherein each cell comprises a photodiode. Each photodiode produces an output on a corresponding one of a plurality on lines 287 which is compared to the corresponding output on a related one of the lines 283 from the fine reference photodetector array in a linear fine ratio calculator 291. This comparison is made for each FX cell to detect the x-axis tilts in the wavefront to, in turn, make fine adjustments in the deformable mirror to correct x-axis tilts in the light beam.

The intensity of the remaining light 293 emanating from the FY filter array 236 impinges on a FY photodetector array 295. Each FY mask cell 253 focuses on a corresponding cell of the FY photodetector array 295, wherein each cell comprises a photodiode. Each photodiode produces an output on a corresponding one of a plurality of lines 297 which is compared to the corresponding output on a related one of the lines 283 from the fine reference photodetector array in the linear fine ratio calculator 291 to detected a spot shift in the y-direction for that cell. This comparison is made for each FY cell to detect the y-axis tilts in the wavefront to, in turn, make fine adjustments in the deformable mirror to correct y-axis tilts in the light beam.

The CX cells and the CY cells detect spot shifts in the same manner described in the open-loop embodiment of the invention.

Referring now to FIG. 17 the FX cell 245 is shown with a centered pixel spot, the circumference of which is shown by a solid line 301. The centered spot produces an FX reference ratio from which a shift in the pixel spot can be compared. The reference ratio for the cell is the intensity of light through the mask cell with the spot in the center as compared to the intensity of light to the corresponding cell in the fine reference photodetector array 281 (FIG. 13). A tilt in the positive x-direction in the subaperture beam on this cell results in a shifted pixel spot, indicated by a dashed line 303. The shifted pixel spot 303 varies (increasing, in this example) the intensity of light through the filter cell which is compared to the light intensity of the corresponding fine reference cell and results in an FX ratio. The FX ratio of the shifted pixel spot is compared to the FX reference ratio of an un-shifted pixel spot to determine the amount of tilt. The deformable mirror is adjusted until the the difference in the ratios is zero and there is no longer a shift in the pixel spot on the cell.

A tilt in the negative x-direction reduces the light intensity and requires the same calculations and adjustments to correct the tilt. This process is repeated for each cell in the FX filter array to detect the entire wavefront of the light beam to be corrected.

Similarly, a tilt in the Y direction is detected by comparing the intensity from a shifted pixel spot to the un-shifted pixel spot on the FY filter cell 253 in the same manner as the FX cell 245 detects tilts in the X direction. The wavefront is adjusted when the pixel spots are centered in the FX filter cells and the FY filter cells.

The foregoing description is merely exemplary and it should be understood that the invention may be implemented with other types of filters to detect shifts in the pixel spot. Although the imaging lenses 147, 229 are describe as identical, imaging lenses may be employed in the fine portion that are different than those in the coarse portion, as long as the size of the mask cells are adjusted accordingly. Further, although a collimator is described to impinge the images on the imaging lenses other devices such as beam splitters or prisms may be employed.

It suffices for the broadest scope of the present invention that wavefront aberrations are detected by a coarse portion having a large dynamic range and a fine portion having very high accuracy. Similarly, although the invention has been shown and described with respect the exemplary embodiments thereof, it should be understood by those skilled in the art that the foregoing and various other changes, omissions and additions in the form of detail thereof may be made therein and thereto, without departing from the spirit and scope of the invention.

We claim:

1. An optical centroid processor wavefront sensor, for detecting the wavefront of a beam of light comprising:
   reference means for providing a reference signal indicative of the intensity of the light in the beam;
   first mask means for filtering the beam of light, having a pair of directional axes, a first one of said axes orientated in a predetermined manner with a second one of said axes, and having a coarse mask function, said coarse mask function being coarse monotonic dependant on light intensity on spot displacement;
   second mask means for filtering the beam of light, having said pair of directional axes, and having a fine mask function, said fine mask function being fine non-monotonic dependant on light intensity on spot displacement;
   first detector means, responsive to said first mask means, for providing a coarse signal indicative of light intensity associated with said coarse mask function, for each of said directional axes;
   second detector means, responsive to said second mask means, for providing a fine signal indicative of light intensity associated with said fine mask functions, for each of said directional axes;
   first calculator means, in accordance with a first predetermined algorithm, for calculating a coarse ratio of said coarse signal and said reference signal, for each of said directional axes, to produce an coarse output signal representative of spot displacement, said output signal adapted to drive an input of a deformable mirror;
   second calculator means, in accordance with a second predetermined algorithm, for calculating a fine ratio of said fine signal and said reference signal, for each of said directional axes, to produce an fine output signal representative of spot displacement, said output signal adapted to drive an input of a deformable mirror; and
   directing means for directing the beam of light onto said reference means, said first mask means, and said second mask means.

2. An optical centroid processor wavefront sensor according to claim 1 wherein said coarse mask function comprises a linear function.

3. An optical centroid processor wavefront sensor according to claim 2 wherein said linear function comprises a plurality of linear mask cell arrays, each having an alternating series of transparent chevrons and opaque chevrons.

4. An optical centroid processor wavefront sensor according to claim 1 wherein said fine mask function comprises a quadratic function, said quadratic function having two portions, a first portion for providing an in phase function, a second portion for providing an out of phase function, said in phase function oriented in a predetermined manner with said out of phase function.

5. An optical centroid processor wavefront sensor according to claim 4 wherein said quadratic function comprises said in phase function having a plurality of in phase mask cell arrays, each having an in phase alternating series of transparent diamond patterns and opaque diamond patterns, and said out of phase mask cell arrays, each having an out of phase alternating series of transparent diamond patterns and opaque diamond patterns.

6. An optical centroid processor wavefront sensor according to claim 1 wherein said first calculator means comprising at least one linear ratio calculation.

7. An optical centroid processor wavefront sensor according to claim 1 wherein said second calculator means further comprising at least one quadratic ratio calculation.

8. An optical centroid processor wavefront sensor, for detecting the wavefront of a beam of light comprising:
   reference means for providing a reference signal indicative of the intensity of the light in the beam;
   first mask means for filtering the beam of light, having a pair of directional axes, a first one of said axes orientated in a predetermined manner with a second one of said axes, and having a coarse mask function, said coarse mask function being coarse monotonic dependant on light intensity on spot displacement;
   second mask means for filtering the beam of light, having a pair of directional axes, a first one of said axes orientated in a predetermined manner with a second one of said axes, and having a fine mask function, said fine mask function being fine monotonic dependant on light intensity on spot displacement;
   first detector means, responsive to said first mask means, for providing a coarse signal indicative of light intensity associated with said coarse mask function, for each of said directional axes;
   second detector means, responsive to said second mask means, for providing a fine signal indicative of light intensity associated with said fine mask functions, for each of said directional axes;
   first calculator means, in accordance with a first predetermined algorithm, for calculating coarse ratio of said coarse signal and said reference signal, for each of said directional axes, to produce an coarse output signal representative of spot displacement, said output signal adapted to drive an input of a deformable mirror;
   second calculator means, in accordance with a second predetermined algorithm, for calculating a fine ratio of said fine signal and said reference signal, for each of said directional axes, to produce an fine output signal representative of spot displacement, said output signal adapted to drive an input of a deformable mirror; and directing means for directing the beam of light onto said reference means, said first mask means, and said second mask means.

9. An optical centroid processor wavefront sensor according to claim 8 wherein said coarse mask function comprises a linear function.

10. An optical centroid processor wavefront sensor according to claim 9 wherein said linear function comprises a plurality of mask cell arrays, each having an alternating series of transparent chevrons and opaque chevrons.

11. An optical centroid processor wavefront sensor according to claim 8 wherein said fine mask function comprises a linear function.

12. An optical centroid processor wavefront sensor according to claim 11 wherein said linear function comprises a plurality of mask cell arrays, each having an alternating series of transparent chevrons and opaque chevrons.

13. An optical centroid processor wavefront sensor according to claim 12 further comprising an opaque border around said chevrons.

14. An optical centroid processor wavefront sensor according to claim 8 wherein said first calculator means comprising at least one linear ratio calculation.

15. An optical centroid processor wavefront sensor according to claim 8 wherein said second calculator means comprising at least one linear ratio calculation.

16. An optical centroid processor wavefront sensor according to claim 8 wherein said reference means further comprises at least one array of reference cells, each having an opaque border around a transparent section.

17. An optical centroid processor wavefront sensor according to claim 8 further comprises switching means, for selecting between said coarse output signal and said fine output signal in accordance with a third predetermined algorithm.

* * * * *